United States Patent [19]

Guerrero

[11] Patent Number: 4,798,937
[45] Date of Patent: Jan. 17, 1989

[54] WARMER PLATE COVER

[76] Inventor: Raul Guerrero, 829 Leslie, Coppell, Tex. 75019

[21] Appl. No.: 23,536

[22] Filed: Mar. 9, 1987

[51] Int. Cl.⁴ .............................................. H05B 3/74
[52] U.S. Cl. ..................................... 219/433; 219/430; 219/439; 126/214 D
[58] Field of Search ............... 219/433, 429, 430, 432, 219/438, 439, 283, 436; 126/400, 211, 214 C, 214 D, 215, 212, 221, 390; 99/447, 279, 281, 284

[56] References Cited

U.S. PATENT DOCUMENTS

| Re. 20,924 | 11/1938 | Nickel | 126/221 |
|---|---|---|---|
| 928,634 | 7/1909 | Cruickshank | 126/215 |
| 966,579 | 8/1910 | Meyers | 125/215 |
| 1,155,519 | 10/1915 | Shapland | 126/215 |
| 1,442,074 | 1/1923 | Kielberg | 126/214 C |
| 1,706,908 | 3/1929 | Westman | 219/433 |
| 3,083,286 | 3/1963 | Swetlitz | 126/390 |
| 4,009,704 | 3/1977 | Marzetta | 126/221 |
| 4,170,931 | 10/1979 | Fajans | 219/433 |
| 4,406,942 | 9/1983 | Lo Conti | 29/433 |

FOREIGN PATENT DOCUMENTS

| 249739 | 7/1912 | Fed. Rep. of Germany | 126/221 |
|---|---|---|---|
| 2515791 | 5/1983 | France | 219/455 |

Primary Examiner—E. A. Goldberg
Assistant Examiner—Teresa J. Walberg
Attorney, Agent, or Firm—Hubbard, Thurman, Turner & Tucker

[57] ABSTRACT

A brewing apparatus for brewing coffee or the like having a warmer plate includes a warmer plate cover of heat resistant plastic material. The warmer plate includes a top surface and a bottom surface. The top surface is patterned to produce uniform heat distribution for removing any hot spots in the warmer plate to reduce substantially any further brewing action of the brew thereby prolonging the desired freshness taste of the brew. The bottom surface is patterned to correspond to the exterior surface shape of the warmer plate. Thus, in one embodiment the surface is flat; in a second embodiment the bottom surface is grooved to correspond to a vessel retaining flange of the warmer plate and includes a depending flange for warmer plate cover retention on the warmer plate. The warmer plate cover being of plastic soft enough to reduce substantially the breaking of fragile brew vessels.

5 Claims, 2 Drawing Sheets

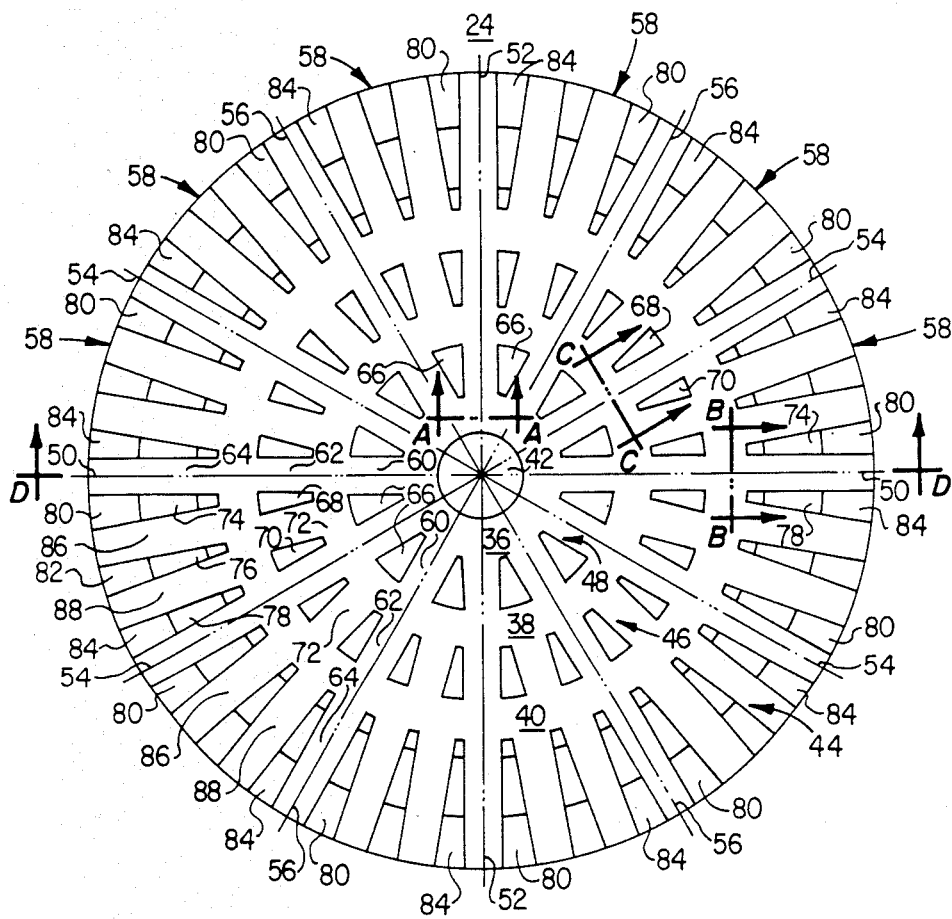
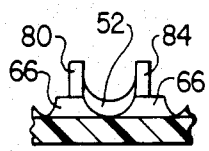
FIG. 3
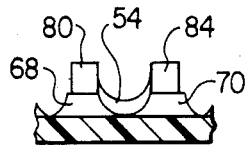
FIG. 5
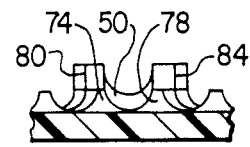
FIG. 4
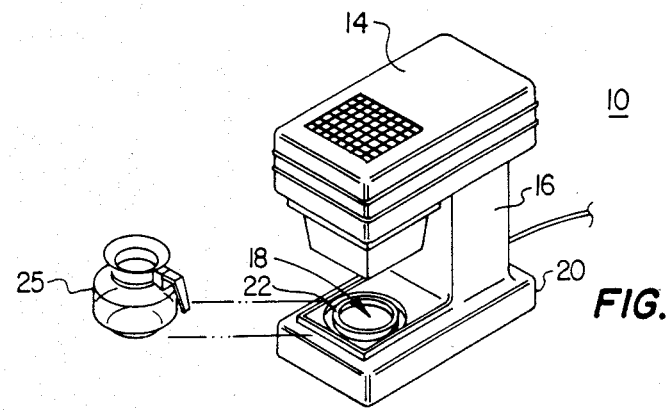
FIG. 1

WARMER PLATE COVER

This invention relates to brewing devices and more particularly to an improved brewing device.

BACKGROUND OF THE INVENTION

In the past brewing devices such as, for example, coffee makers have included heat distributor plates, hereinafter referred to as warmer plates, for keeping the freshly made coffee contained in a glass vessel hot. A disadvantage of these devices is that the coffee quickly looses its freshly brewed quality and becomes stale within a couple of hours. A further disadvantage of these devices is that under conditions of frequent handling the glass vessels are subject to breakage when brought into contact with warmer plates which typically are made of metals or alloys thereof.

The breakage problem is highlighted in U.S. Pat. No. 3,145,708 issued Aug. 25, 1964 to Kenneth J. Fischer. This patent notes that a glass or ceramic coffee maker vessel tends to crack and break along its bottom area that includes the portion thereof that is directly subjected to the heating source, and teaches the use of a brewing vessel protector. The protector includes a metal protector cover, cup or cup adapted to space the glass vessel from direct contact with the metal warmer plate. The cup is constructed to snap on to the glass vessel. Thus, it can be readily removed from the glass vessel for cleaning or subsequent use with another vessel during the cleaning of a previously used vessel. Those persons skilled in the art desiring further information about the device are referred to the patent.

A bun warmer or potato baker is known which includes a handled body portion having a top surface. The top surface includes raised, eccentric rings spaced one from the other to provide flat surfaces therebetween. The flat surfaces include an outer surface having apertures grouped in pairs between raised louvered vents; the inner surfaces including only the louvered vents. In operation the foodstuff is placed on the rings and placed on a warmer. Hot air rises vertically through the apertures and louvered vents. The latter causes turbulence which distributes the heat for uniform heating of the foodstuff. This device is disclosed in detail in U.S. Pat. No. 4,446,776 issued May 8, 1984.

Another known cooking device includes an apertured corrugated plate. A food supporting rack is supported by legs above the corrugated plate. A pad of heat non-conducting material having a thickness considerably less than the space between the rack and plate is positioned over the plate. The pad covers a portion of the apertures to diver the heated air currents outwardly so it will enter a hood adjacent the periphery of the plate. In this manner the bottom of the article to be cooked will not be cooked too rapidly in comparison with the rest of the article and be burned before the rest is done. This device is disclosed in U.S. Pat. No. 1,685,829 issued Oct. 2, 1928 to S. Sauvage. Other known devices are similar to those described above. A heating utensil which includes fins on the underneath side of a bottom surface for heat distribution is disclosed in U.S. Pat. No. 2,213,378 issued Sept. 3, 1940 to M. E. Benesh, and a radiant toaster having a base which includes an outer flanged down ring and a radiant center of tongue type openings for lengthening the heating path is disclosed in U.S. Pat. No. 2,546,795 issued Mar. 27, 1951 to J. W. Stechbauer.

The essential difference between the prior art devices and the device of the present invention is the provision of a warmer plate cover for a brewing device for providing uniform temperature on the bottom of the vessel consistent with the temperature of the remaining portions of the vessel to uniformly heat the fluid content of the vessel thereby alleviating the development of burnt and stale coffee taste characteristics in the fluid and glass breaking stresses in the vessel.

SUMMARY OF THE INVENTION

Accordingly, it is an object of the invention to provide an improved fluid making device.

Another object of the invention is to provide a fluid making device capable of brewing and prolonging the fresh taste life of the brew.

A further object of the invention is to provide a fluid making device capable of extending the mean time before failure of the fluid container.

Briefly stated the invention includes a brewing device including a warmer plate cover of plastic material able to withstand heat and act both as an even heat distributor and as a shock absorber for protecting a glass vessel from breakage during placement on the warmer plate. The plate has an upper surface configured to circulate air heated by the warmer plate about a glass vessel placed on the cover for producing a uniform temperature on the bottom of the vessel consistent with the temperature of the remaining portions of the vessel thereby alleviating the development of burnt and stale brew taste characteristics in the brew and of glass breaking stresses in the vessel whereby the life of the fresh taste of brew is prolonged.

BRIEF DESCRIPTION OF THE DRAWINGS

Other objects and features of the invention will become more readily apparent from the following detailed description when read in conjunction with the drawings in which:

FIG. 1 is an isometric view of a brew maker constituting the subject matter of the invention;

FIG. 2 is a plan view of the warmer plate cover of the improved brew maker of FIG. 1;

FIG. 3 is a partial cross-sectional view of the warmer plate cover taken along line A—A of FIG. 2;

FIG. 4 is a partial cross-sectional view of the warmer plate cover taken along B—B of FIG. 2;

FIG. 5 is a partial cross-sectional view of the warmer plate cover taken along line C—C of FIG. 2;

DESCRIPTION OF THE PREFERRED EMBODIMENT

Figure 6:
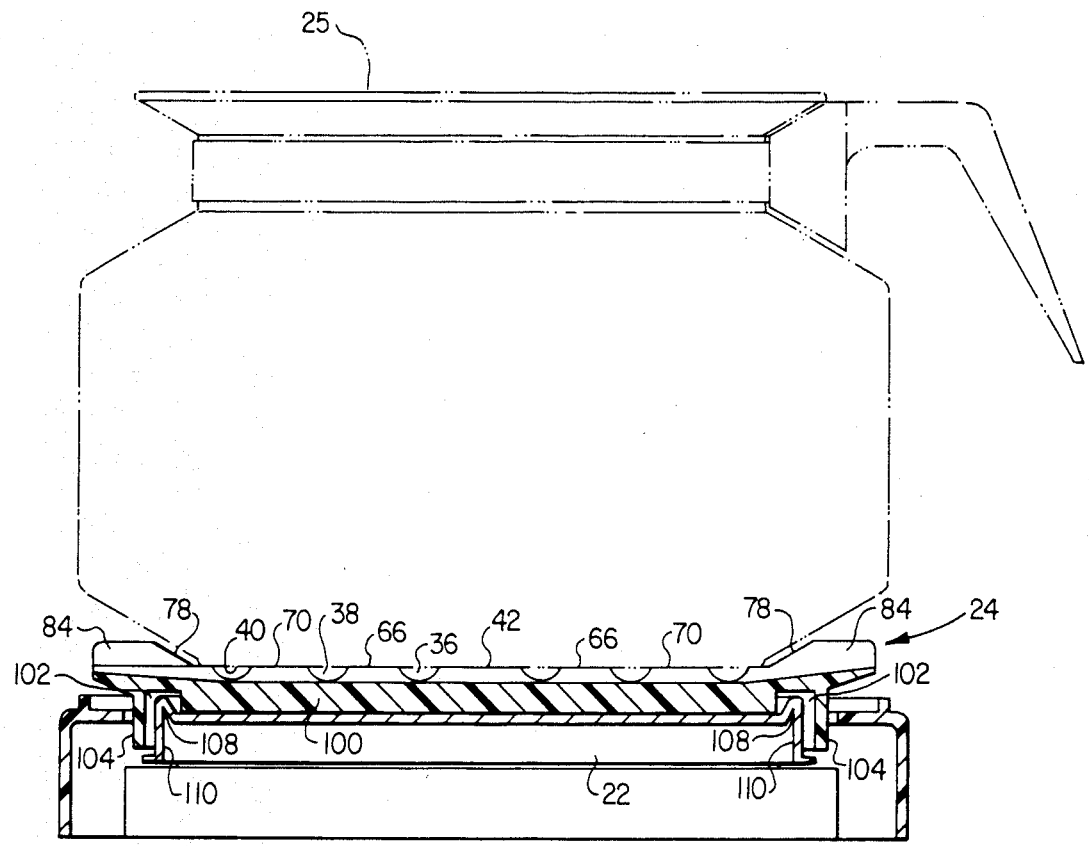
FIG. 6 is a cross-sectional view of the brew making device taken along line D—D of FIG. 1 and showing in outline the brewing vessel positioned on the warmer plate.

The brew maker 10 (FIG. 1) is for illustrative purposes only and not by way of limitation, a coffee maker including a coffee brewing means mounted in a housing 14 supported by a support member 16 above a warmer plate means 18 mounted in a warming plate housing 20. The coffee brewing means (not shown) typically includes a coffee filter supporting means into which a filter containing a preselected amount of drip ground coffee is positioned. A water container is positioned above the coffee filter. A heater heats the water to its boiling point. When the water reaches the desired temperature, a valve is actuated to release the water into the coffee filter.

The warmer plate means includes a warmer plate 22 positioned directly above a heater element. A warmer plate cover 24 (FIG. 6), hereinafter more fully described, is mounted over the warmer plate and a glass vessel 25 is placed on the warmer plate cover for receiving the brewed coffee dripping from the filter. The warmer plate acting through the warmer plate cover maintains the temperature of the coffee.

Figure 7:
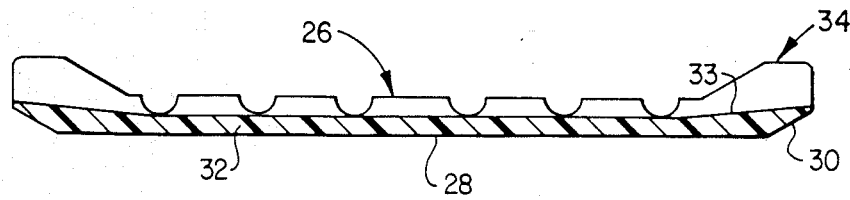
FIG. 7 is the cross-sectional view of the warmer plate cover of FIG. 1 modified to form a universal type warmer plate cover.

The warmer plate cover 24 (FIGS. 2-7) is fabricated using a rigid, heat resistant, material such as, for example, a synthetic resin polymer sold under the trademark TEFLON. The warmer plate cover in a first embodiment (FIG. 7) includes a plate 26 having a flat circularly shaped bottom 28 having a outwardly and upwardly extending base periphery 30 of about thirty degrees with respect to the horizontal. The plate 26 has a lower body 32 having a uniform portion extending radially from the center to the beginnging of an upwardly and outwardly increasing tapered body thickness 33 having a surface slope of about five degrees.

A patterned upper body 34 (FIGS. 2-7) is formed integrally with the lower body 32. The pattern of the upper body 34 includes a plurality of spaced circular grooves 36, 38, and 40 (FIG. 2) formed concentrically about the center. Circular groove 36 defines a centrally disposed circular surface 42. While, circular grooves 36 and 38, 38 and 40, and 40 and outer peripheray, form annular rings 44, 46, and 48.

The upper body 34 including the annular rings 44, 46 and 48 is quartered by a pair of radial grooves 50 and 52 extending outwardly from the centrally disposed circular center surface 42. These grooves 50 and 52 are disposed orthogonally to each other to form what for purposes of description, may be considered "x" and "y" axis. Each quarter section is sub-divided by two equally spaced (30° and 60°) grooves 54 and 56 extending radially from the center circle surface 42 outwardly to the outer periphery to form circle sectors 58. The circular grooves 36, 38, 38 and 40 divide each of the circle sectors 58 into a plurality of circle segments 60, 62, and 64 as the segments of the plurality of circle segments in each ring 44, 46, and 48 are identical only one each will be described. The centrally disposed circle segment 60 includes a substantially triangularly shaped flat top surface 66 formed by the circle segment forming grooves 50 and 54. While circle segment 62, formed intermediately of circle segments 60 and 64, has two truncated triangular shaped flat top surfaces 68 and 70 (15° apart) formed by a groove 72 intermediate the grooves 50 and 54. Lastly, circle segment 64 has three truncated triangular shaped top surfaces 74, 76, and 78 (10° apart) which are integral with upwardly and outwardly formed flat top flanged surfaces 80, 82, and 84. The shaped top surfaces are defined by grooves 86 and 88 equally spaced between grooves 50 and 54.

The circular grooves 36, 38, and 40 have semicircularly shaped bottoms of radii sufficient for forming ends of the above mentioned flat surfaces which are curvilinear ends with upwardly and inwardly formed end surfaces. While the radially disposed grooves 50 (FIG. 4), 52 (FIG. 3), 54 (FIG. 5), 56, 72, 86, and 88 have semicircularly shaped bottoms of a radii corresponding to the radii of the circular grooves 38, 40, and 42.

With the patterned surface configured as described above, the radial grooves 50, 52, 54, and 56, as shown in FIGS. 3, 4, and 5, from in-line sides of adjacent surfaces 66, 68, 74, and 80, of a first circle sector and opposing in-line sides 66, 70, 78, and 84 of a second or adjacent circle sector. The remaining circle sectors are identical and therefore need not be described. It will be noted in FIG. 2 that the surface 66 of circular segment 60 is in line with groove 72 of the circle sector segment 62. While the surfaces 68 and 70 of circular segment 62 formed by groove 72, only partially shield (about 50%) the grooves 86 and 88 of circle sector segment 64.

From the above description it will be readily apparent to one skilled in the art that when a brewing vessel is positioned on the patterned warmer plate cover (FIG. 6) and the warmer plate turned on hot air is circulated from the center circular groove 36 (FIG. 2) through the radial grooves 50, 52, 54, and 56 to the circle sector segment grooves 38 and 40. Circle sector segment groove 38 receives hot air from the radial grooves and feeds grooves 72 of circle segments 62. The hot air leaving the grooves 72 is collected by circle segment forming groove 40 where it combines in a turbulent manner with hot air from the radial grooves 50, 52, 54, and 56. Hot air from the circle sector segment groove 40 is divided by the surfaces 76, 82 to grooves 86 and 88 of the circle sector segments 64. The hot air from the up-raised portions of the exteriorly disposed body portions 80, 82, and 84 of circle sector segments 64 form chimneys for carrying off the hot air. In this manner, a uniform distribution of heat throughout the warmer cover plate is accomplished. The result is that the temperature remains uniformly below the brewing temperature, the brew therefor no longer brews in the vessel and retains its fresh taste for a considerably longer period.

In a second embodiment, the warmer plate cover 26 (FIG. 6) includes bottom 100 having a circular groove 102 adjacent to the interior side of a peripherally disposed depending flange 104. The recessed groove 102 is adapted to receive a vessel retaining flange 108 with depending flange adapted to engage the vertical walls of the warmer plate 110. Thus, in this arrangement the warmer plate cover is adapted for use with its bottom 100 in physical contract with the top surface of the warmer plate for improved uniform heat transfer, and retained by the depending flange from slippage off the warmer plate.

Although several embodiments of the invention have been described, it will be apparent to a person skilled in the art that various modifications to the details of construction shown and described may be made without departing from the scope of this invention.

What is claimed is:

1. In an automatic brewing device having an electrically heated warmer plate with a glass vessel supporting surface for maintaining a beverage at a constant elevated temperature and a spacer positioned intermediate the warmer plate and glass vessel to prevent excessive heating of the beverage in the glass vessel, the improvement comprising:

a warmer plate cover means of rigid, heat resistant plastic material having a softness sufficient for reducing substantially glass vessel breakage during use, said warmer plate cover forming a spacer between the warmer plate and glass vessel and including a body portion having first and second opposing surfaces, the first opposing surface corresponding to the glass vessel supporting surface of the warmer plate, and the second opposing surface including a substantially flat surface portion having a plurality of spaced, concentric grooves about a center portion for dividing the flat surface portion into a plurality of rings about the center portion, a plurality of spaced radial grooves extending from the groove defining the center portion for dividing each ring of the plurality of rings into a plurality of circle sector segments with said uniformly shaped circle sector segments of the ring adjacdnt to the Center portion having a preselected size defined by surrounding grooves, and each additional ring of circle sector segments having increasing numbers of radial grooves interconnecting adjacent ring forming grooves for dividing the rings of circle sector segments into increasing number of uniformly shaped circle segments, all of said grooves being in open communication with each other and coacting with a bottom of the glass vessel for forming hot air passages producing uniform heat distribution throughout the warmer cover plate for alleviating heat generated stresses within the glass vessel while maintaining the beverage temperature uniformly below the brewing temperature.

2. In an automatic brewing device according to claim 1 wherein the body portion of the warmer plate cover includes an upwardly and outwardly sloping flange forming a retainer for the glass vessel, said flange having first and second surfaces with said second surface forming an extension of the second surface of the body portion including the radial grooves and circle segments of the outer ring.

3. In an automatic brewing device according to claim 1 wherein the first surface of the body portion of the warmer plate cover is flat to correspond to a flat warmer plate and includes a retainer for engaging the warmer plate to prevent slippage.

4. In an automatic brewing device according to claim 3 wherein the retainer means is a depending flange.

5. In an automatic brewing device according to claim 3 wherein the retainer means is a groove for engaging a correspondingly shaped protruding member formed on a warmer plate surface.

* * * * *